(12) United States Patent
Kwon et al.

(10) Patent No.: US 8,610,863 B2
(45) Date of Patent: Dec. 17, 2013

(54) LIQUID CRYSTAL DISPLAY PANEL

(75) Inventors: Ji-Hyun Kwon, Asan-si (KR);
Hyeok-Jin Lee, Seongnam-si (KR);
Byoung-Sun Na, Suwon-si (KR);
Lujian Gang, Suwon-si (KR);
Dong-Hyeon Ki, Cheonan-si (KR);
Hwa-Sung Woo, Suwon-si (KR)

(73) Assignee: Samsung Display Co., Ltd. (KR)

( * ) Notice: Subject to any disclaimer, the term of this patent is extended or adjusted under 35 U.S.C. 154(b) by 686 days.

(21) Appl. No.: 12/019,440

(22) Filed: Jan. 24, 2008

(65) Prior Publication Data

US 2008/0186439 A1    Aug. 7, 2008

(30) Foreign Application Priority Data

Feb. 1, 2007    (KR) ................. 10-2007-0010562

(51) Int. Cl.
*G02F 1/1343*    (2006.01)

(52) U.S. Cl.
USPC ........... 349/144; 349/139; 349/141; 349/145; 349/146

(58) Field of Classification Search
USPC .................................... 349/139–147
See application file for complete search history.

(56) References Cited

U.S. PATENT DOCUMENTS

| | | | | |
|---|---|---|---|---|
| 5,886,762 | A * | 3/1999 | Lee et al. ................. | 349/141 |
| 2004/0227888 | A1 * | 11/2004 | Tak et al. ................. | 349/139 |
| 2004/0238823 | A1 * | 12/2004 | Lee et al. ................. | 257/72 |
| 2005/0078263 | A1 | 4/2005 | Kim et al. | |
| 2005/0286003 | A1 * | 12/2005 | Lee et al. ................. | 349/141 |
| 2006/0023134 | A1 | 2/2006 | Um et al. | |
| 2006/0268206 | A1 * | 11/2006 | Nishimura ............... | 349/114 |
| 2007/0024789 | A1 * | 2/2007 | Itou et al. ................ | 349/139 |
| 2008/0001883 | A1 * | 1/2008 | Kim et al. ............... | 345/92 |
| 2008/0002123 | A1 * | 1/2008 | Kim ........................ | 349/139 |

FOREIGN PATENT DOCUMENTS

| | | |
|---|---|---|
| CN | 1503373 A | 6/2004 |
| CN | 1605921 A | 4/2005 |
| JP | 2000-081641 | 3/2000 |
| JP | 2003-322869 | 11/2003 |
| JP | 2004-341530 | 12/2004 |
| KR | 1020020048854 | 6/2002 |
| KR | 1020040097765 | 11/2004 |
| KR | 1020050023085 A | 3/2005 |

\* cited by examiner

*Primary Examiner* — Huyen Ngo
(74) *Attorney, Agent, or Firm* — Innovation Counsel LLP (57) ABSTRACT

An LCD panel is provided for improving a contrast ratio by suppressing light leakage around gate lines of an assembly that is structured to support a liquid crystal alignment mode that enhanced side view visibility of the LCD image. The LCD panel includes a first base substrate, a plurality of gate lines and a plurality of data lines disposed on the first base substrate and crossing each other, a pixel electrode comprising a first oblique line and a second oblique line disposed on the first base substrate and inclined in a different direction from each other with respect to the gate lines, a second base substrate, a common electrode disposed on the second base substrate and alternately positioned with the pixel electrode, wherein a portion of the common electrode overlaps the gate line segment, and a liquid crystal layer disposed between the first and second base substrates.

13 Claims, 6 Drawing Sheets

LIQUID CRYSTAL DISPLAY PANEL

CROSS REFERENCE TO RELATED APPLICATIONS

This application claims priority to Korean Patent Application No. 2007-0010562 filed on Feb. 1, 2007 and all the benefits accruing therefrom under 35 U.S.C. §119, and the disclosure of which are herein incorporated by reference in its entirety.

BACKGROUND

1. Field of Invention

The present disclosure of invention relates to a liquid crystal display ("LCD") panel and, in particular, to an improved LCD panel which is capable of inhibiting light leakage around gate lines when using a liquid crystal alignment distribution mode that is intended to provide enhanced side view visibility and to also provide high transmissivity for improving apparent contrast ratio.

2. Description of Related Technology

An LCD device displays a desired image by supplying a video signal to liquid crystal cells arranged in a matrix form and by controlling light transmissivity of the individual liquid crystal cells according to pixel drive signals embedded in the video signal. Optical viewing angle technologies have been developed to solve a viewing angle problem inherent to LCDs wherein appearance of a displayed image might be distorted according to a location from which a viewer watches a screen where the location may be one other than that of a heads on direct facing view of the screen.

The optical viewing angle improving technologies used for LCD devices include a so-called, Patterned-ITO Vertical Alignment ("PVA") mode, an In-Plane Switching ("IPS") mode, and a Plane-to-Line Switching ("PLS") mode.

In the PVA mode, a fringe electric field is generated between a common electrode and a pixel electrode formed respectively in first and second base substrates due to provision of slits in the electrodes. Liquid crystal molecules are symmetrically driven into different orientations on the basis of the placement of the slits and the distributed fringe electric fields generated around the locals of the slits, thereby forming a multi-domain distribution of crystal orientations. In the IPS mode, the liquid crystal molecules are oriented by a lateral electric field formed between a common electrode and a pixel electrode where the latter are both formed to be parallel to each other on a second base substrate. Also in the PLS mode, an insulator is disposed between the common electrode and the pixel electrode in each pixel area. In the PLS mode, an electric field having horizontal and vertical components is generated between the common electrode and the pixel electrode to drive liquid crystal molecules filled between first and second base substrates in each pixel area. In the IPS mode and PLS modes, since the electric field is generated by forming the two electrodes on one same substrate, undesirable image sticking occurs and the light transmissivity is decreased. On the other hand, in the PVA mode, an aperture ratio of each pixel area is comparatively low due to the presence of slits in the common and pixel-electrodes. To solve the above problems, a Dual Field Switching ("DFS") mode has been recently proposed.

In the proposed DFS mode, liquid crystal molecules are both laterally and vertically aligned with respect to a shaped electric field generated by specially shaped electrode patterns formed on first and second side transparent substrates of the LCD panel. One embodiment of the DFS mode uses a common electrode and a pixel electrode linearly formed in respective planes on the first and second base substrates. The liquid crystal molecules are aligned using a liquid crystal driving electric field in which a lateral (horizontal) portion of the electric field and a vertical portion of the electric field are generated between the common electrode and the pixel electrode in a mixed distributive manner, thereby improving side view visibility and also improving light transmissivity (by keeping the per pixel aperture ratio relatively large). In the DFS mode, since the liquid crystal molecules are driven by electrodes formed over the whole pixel unit area, the transmission area is wide and thus provides good transmissivity. However, the liquid crystal molecules are easily moved by the influence of electric fields from adjacent electrodes (in particular those from adjacent gate lines) and thus it is difficult to prevent extraneous orientations of liquid crystal molecules from being formed about peripheral regions of the different pixel areas.

An LCD panel using a conventional form of the proposed DFS mode suffers from a relatively low contrast ratio when displaying a black or dark gray level since light leakage tends to occur in the vicinity of gate lines due to extraneous orientations of liquid crystal molecules around the gate lines. More specifically, since in the conventional DFS mode, the orientations of liquid crystal molecules in the vicinity of the gate lines are irregularly arranged by the fringe electric fields generated about the gate lines during a horizontal scan interval and these gate line fields are not controllably influenced by the different control voltages being stored on the pixel electrode of the adjoining pixel unit, the irregularly arranged liquid crystal molecules in the area of gate lines are not capable of properly suppressing light transmissivity when a black or dark gray level is desired in the adjoining pixel area, and they thereby can generate light leakage and decrease the apparent contrast ratio of the black or dark gray level in the adjoining pixel area in certain situations so as to give users of the DFS operated panel the impression that the adjoining pixel area is not as dark as it should be. More specifically, although the LCD panel of the DFS mode uses a black matrix in the vicinity of the gate lines for the purpose of blocking light leakage around peripheral edges of each pixel area, the black matrix has a tendency to deviate during mass production from its design-specified normal location due to an arrangement (alignment) error of the first and second base substrates when assembling the LCD panel on a mass production basis. The so-misaligned black matrix is incapable of blocking all the light leakage generated by the liquid crystal molecules adjacent to the gate lines and thus the contrast ratio of the black or dark gray level is disadvantageously decreased when misalignment of the black matrix occurs.

SUMMARY

The present disclosure of invention provides an LCD panel which includes means for shielding against extraneous electric fields being generated in the vicinity of the gate line segments that adjoin darkened pixel areas and it thus prevents extraneous orientations of liquid crystal molecules in the vicinity of the gate line segments from occurring and it thus reduces the corresponding light leakage that tends to occur around the vicinity of the gate lines, this thereby improving the apparent contrast ratio for darkened pixels of the LCD panel.

In an exemplary embodiment, the LCD panel includes a first base substrate, a plurality of gate lines and a plurality of data lines disposed on the first base substrate and crossing each other, a pixel electrode comprising a first oblique line and a second oblique line disposed on the first base substrate and inclined in a different direction from each other with respect to the gate lines, a second base substrate, a common electrode disposed on the second base substrate and alternately positioned with the pixel electrode, wherein a portion of the common electrode overlaps the gate line segment; and a liquid crystal layer disposed between the first and second base substrates.

In some embodiments, the pixel electrode is formed to have spaced apart first stripes with a prescribed spacing distance and wherein the common electrode is formed to have spaced apart second stripes with the same spacing distance.

In some embodiments, a portion of the common electrode overlaps a gate electrode.

In an exemplary embodiment, the LCD panel includes a first base substrate, a plurality of gate lines and a plurality of data lines disposed on the first base substrate and crossing each other, a pixel electrode comprising a first oblique line and a second oblique line disposed on the first base substrate and inclined in a different direction from each other with respect to the gate lines, a second base substrate, a common electrode disposed on the second base substrate, wherein the common electrode comprises, a first pattern line formed to be parallel with the data line, a second pattern line alternating with corresponding pattern lines of the pixel electrode according to a prescribed distance to form a liquid crystal driving electric field together with the pixel electrode and a third pattern line overlapping the gate line segment and a liquid crystal layer disposed between the first and second base substrates.

In some embodiments, the third pattern line is formed with a substantially larger width than a width of the underlying gate line segment.

In some embodiments, the second pattern line is obliquely formed to correspond to the pixel electrode.

In some embodiments, the common electrode includes a slit formed in the third pattern line on the gate line.

In some embodiments, the slit is formed on the gate line to be parallel with the gate line.

In some embodiments, the slit divides the third pattern line overlapping the gate line into at least two parts.

In some embodiments, the portion of common electrode overlaps the gate electrode.

In an exemplary embodiment, the LCD assembly includes a first base substrate and a second base substrate, the first base substrate having a pixel-electrode and an adjacent gate line segment formed thereon and the second base substrate having a common electrode formed thereon, wherein the common electrode and the pixel-electrode have staggered line patterns respectively defined therein for defining liquid crystals driving fields for driving interposed liquid crystals into distributed orientations so as to allow for side viewing of a displayed image as well as heads on viewing of the image and wherein the common electrode has a gate line overlapping portion that generously overlaps the adjacent gate line segment so that at least one of the liquid crystals driving fields substantially intermixes with an extraneous electric field formed between the gate line overlapping portion and the gate line segment so as to thereby co-influence liquid crystals influenced by the extraneous electric field.

BRIEF DESCRIPTION OF THE DRAWINGS

The above and other features of the present disclosure of invention will be more apparent from the following detailed description in conjunction with the accompanying drawings, in which.

DETAILED DESCRIPTION

Exemplary embodiments of the present invention are described herein with reference to the accompanying drawings. The same reference numbers will be used throughout the drawings to refer to the same or like parts. Detailed descriptions of well-known nuts and bolts functions and structures may be omitted herein to avoid obscuring the subject matter of the present disclosure of invention.

Figure 1:
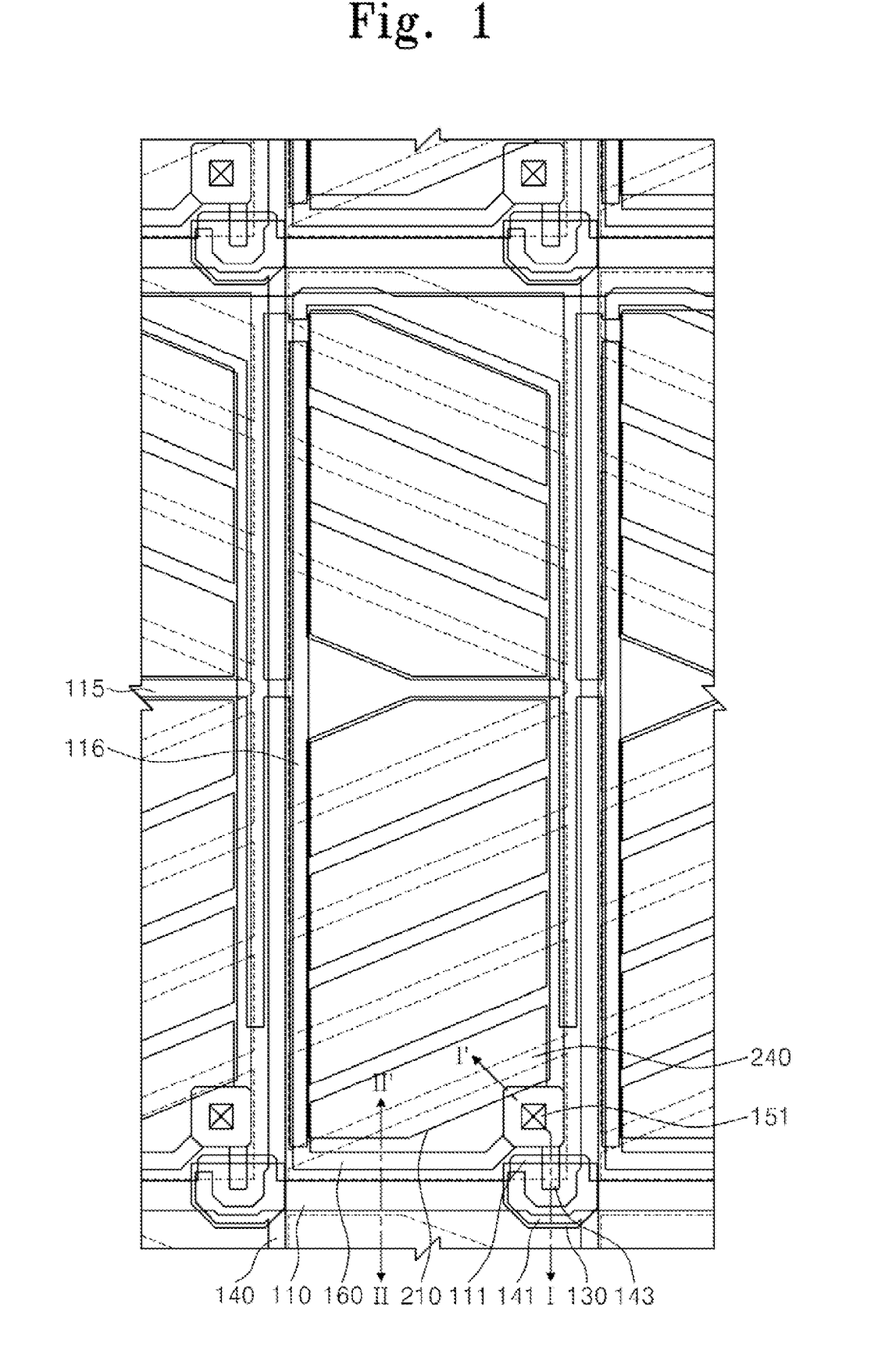
FIG. 1 is a plan view illustrating an LCD panel according to an exemplary first embodiment.
Figure 2:
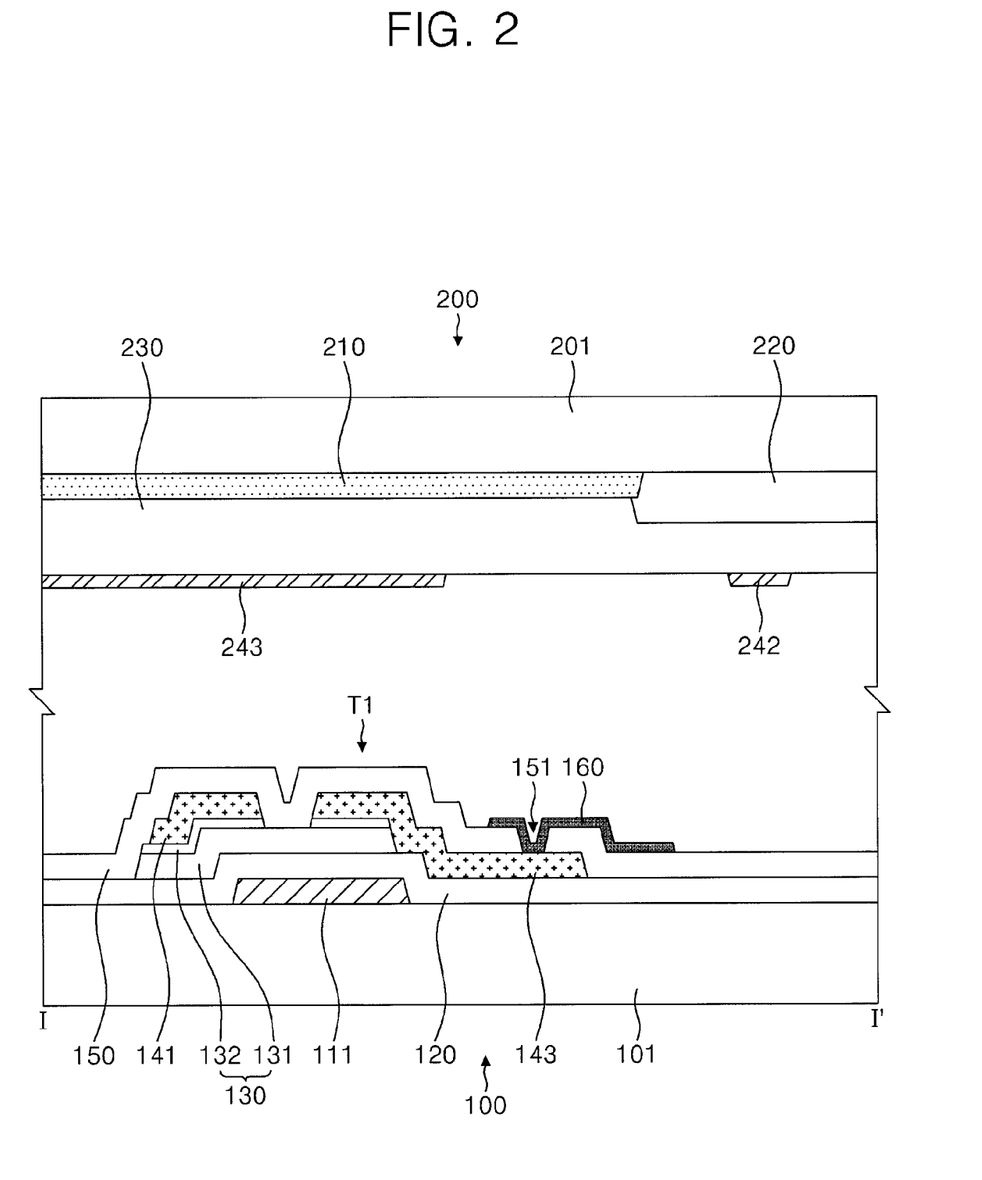
FIG. 2 is a cross-sectional view taken along line I-I' of FIG. 1.
Figure 3:
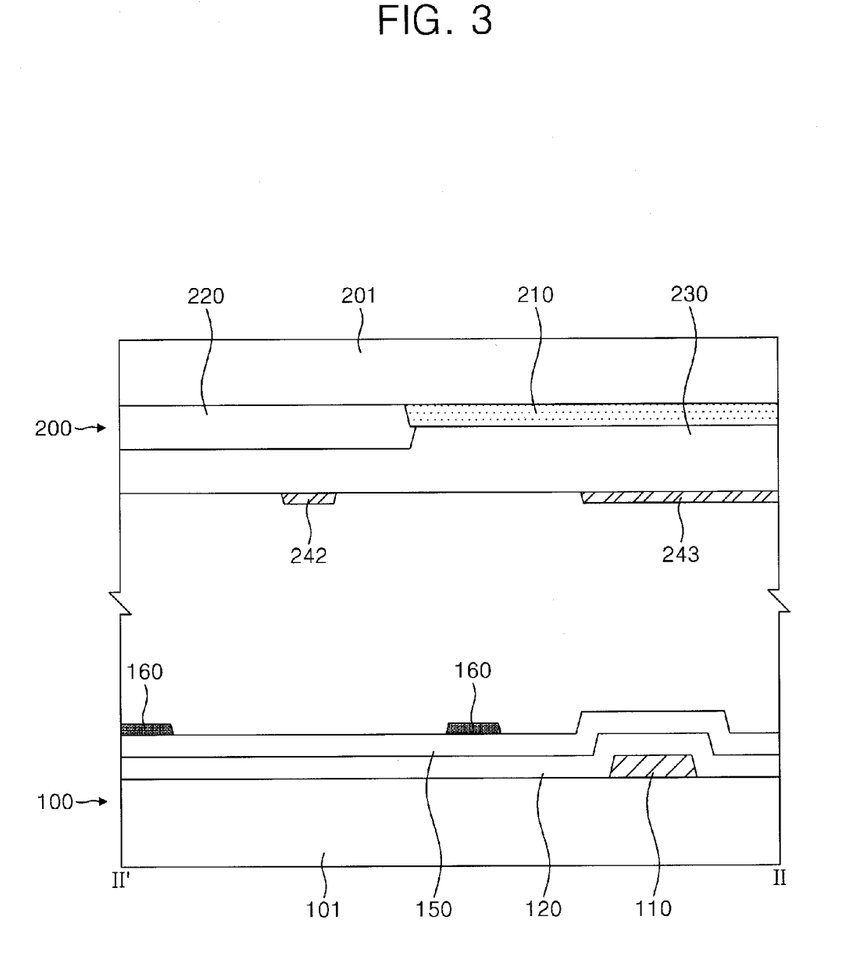
FIG. 3 is a cross-sectional view taken along line II-II' of FIG. 1.

FIG. 1 is a plan view illustrating an LCD panel according to an exemplary embodiment. FIG. 2 and FIG. 3 are cross-sectional views taken along line I-I' and line II-II' of FIG. 1, respectively.

Referring to FIG. 1 to FIG. 3, the LCD panel includes a TFT substrate 100, a color filter substrate 200 affixed in spaced apart facing relation to the TFT substrate 100, and liquid crystals interposed between the TFT substrate 100 and the color filter substrate 200.

The TFT substrate 100 includes a gate line 110 and a data line 140 formed on a first base substrate 101, and a pixel electrode 160 formed as linear stripes in a corresponding pixel area, where the corresponding pixel area is bounded by the gate line 110 and the data line 140. The color filter substrate 200 includes a common electrode 240 designed to form shaped first electric fields together with the pixel electrode 160. The common electrode 240 is formed as linear stripes that are staggered to alternate with the stripes of the pixel electrode 160 according to a prescribed staggering distance and to also generously overlap with the gate line 110.

The liquid crystals are driven into corresponding orientations by the electric fields generated by a difference of a data voltage supplied to the pixel electrode 160 of TFT substrate 100 and of a common voltage supplied to the common electrode 240 of the color filter substrate 200. The supplied data voltage thus controls the transmissivity of light supplied from a light source through the corresponding pixel area. In one embodiment, the liquid crystals are normally horizontally aligned and provided with positive dielectric anisotropy.

The TFT substrate 100 includes the gate line 110 and the date line 140 formed on the first base substrate 101 by crossing each other, a TFT denoted as T1 and formed in a corner of the pixel area, where the pixel electrode 160 connects to the TFT T1. A protective layer 150 covers the TFT T1 to insulate the TFT T1 from other electrodes. A storage line 115 may be formed to run parallel with the gate line 110 and to connect to a storage electrode 116 that forms a charge storage capacitor. As understood by artisans skilled in the art, the storage capacitor augments an LCD capacitor defined by the pixel-electrode, the overlapping portion of the common electrode and the liquid crystal dielectric therebetween.

The first base substrate 101 portion of the TFT substrate is made of a transparent insulating material such as glass or plastic.

The gate line 110 is transversely formed on the first base substrate 101. In one embodiment, the gate line 110 is formed of a single layer or a plurality of conductor layers including one of molybdenum ("Mo"), niobium ("Nb"), copper ("Cu"), aluminum ("Al"), chrome ("Cr"), silver ("Ag"), tungsten ("W"), or an alloy thereof. A gate electrode 111 is formed in a crossing area of the gate line 110 and the data line 140.

The data line 140 is vertically formed on the first base substrate 101. In one embodiment, the data line 140 is formed of a single layer or a plurality of conductor layers including one of molybdenum ("Mo"), niobium ("Nb"), copper ("Cu"), aluminum ("Al"), chrome ("Cr"), silver ("Ag"), titanium ("Ti"), or an alloy thereof. A source electrode 141 and a drain electrode 143 are formed in a crossing area of the gate line 110 and the data line 140.

The TFT T1 includes the gate electrode 111, a gate insulation layer 120 which insulates the gate electrode 111 from a semiconductor layer 130, the semiconductor layer 130 formed on the gate insulation layer 120, and source and drain electrodes 141 and 143 spaced apart from each other on the semiconductor layer 130.

The gate electrode 111 protrudes from the one side of the gate line 110 and controls a driving of the TFT T1 through a gate driving signal supplied from the gate line 110. During a horizontal scan period, the gate driving signal drives the TFT to be turned on so as to charge its pixel-electrode towards a desired data voltage.

The gate insulation layer 120 covers the gate electrode 111 to insulate the gate electrode 111 made of a conductive metal material from other electrodes made of other metal materials.

The semiconductor layer 130 includes an active layer 131 made for example of amorphous silicon and an ohmic contact layer 132 made for example of heavily doped (e.g., N+) amorphous silicon.

The source electrode 141 is formed in, but not limited to, a "U" shape so as to surround the drain electrode 143 but remain spaced apart from the drain electrode 143 with a prescribed distance (a channel length). The source electrode 141 may be formed in various shapes.

One side of the drain electrode 143 is formed to face the source electrode 141 and the other side thereof is formed with a wider area to be connected to the pixel electrode 160 of the corresponding pixel area. The drain electrode 143 may be formed in various shapes.

The source electrode 141 receives a data signal from the data line 140 where the data signal defines a light transmissivity that is to be attained by the pixel area in order to display a corresponding image. The drain electrode 143 receives a passed-through data voltage as passed from the source electrode 141 through the channel region of the semiconductor layer 130 when the TFT is turned on. The data voltage supplied to the drain electrode 143 is further transferred to the pixel electrode 160 connected to the other side of the drain electrode 143.

In one embodiment, the protective layer 150 is formed of an inorganic material such as a silicon nitride ("SiNx") or a silicon oxide ("SiOx"), or an organic material such as acrylic, polyimide or benzoclylobutene ("BCB"). The protective layer 150 is formed as a single layer or multiple layers staked by the inorganic material and the organic material. The protective layer 150 covers the TFT T1 and the gate insulation layer 120 to insulate the TFT T1 from other electrodes such as the pixel electrode 160. The protective layer 150 includes a contact hole 151 exposing a part of the drain electrode 143 for contact with the pixel-electrode 160. The contact hole 151 may be formed by etching a part of the protective layer 150 covering the drain electrode 143 using a mask.

The pixel electrode 160 is formed on the protective layer 150 and connected to the drain electrode 143 of the TFT T1 through the contact hole 151. The pixel electrode 160 is linearly formed in the pixel area with a prescribed width. The pixel electrode 160 includes vertical lines, horizontal lines and oblique lines. The horizontal lines and vertical lines of the pixel-electrode respectively overlap the storage line 115 and the storage electrode 116 to form the storage capacitor. The oblique lines of the pixel-electrode connect the vertical lines to each other and are spaced apart with a prescribed spacing distance to define a symmetric pattern about a horizontal line located at the center of the pixel area and coaxial with the storage line 115. The oblique lines are inclined with respect to the long or short sides of the first base substrate 101.

A first liquid crystals alignment layer (not shown) is formed on the top surface of the TFT substrate 100 including the pixel electrode 160. In an exemplary embodiment, a horizontal alignment layer is formed on the TFT substrate 100. A rubbing direction of the alignment layer is parallel with the long or short side of the first base substrate 101. The oblique lines of the pixel electrode 160 are at a prescribed angle with respect to the rubbing direction of the alignment layer. In one embodiment, the prescribed angle is about 10° to about 30°

The color filter substrate 200 includes the black matrix 210 on a second base substrate 201 to help prevent light leakage. The color filter substrate 200 also includes the color filter 220 to display colors, an overcoat layer 230 to reduce the stepped height or to improve planarity between the black matrix 210 and the color filter 220, and the common electrode 240 to supply the common voltage to the liquid crystal. The black matrix 210 is formed so that it vertically overlaps the TFT T1, the gate line 110, the data line 140, and the storage line 115 of the TFT substrate 100 in order to prevent light from leaking. The black matrix 210 may be formed of an opaque organic material or metal.

The color filter 220 is formed under the black matrix 210 and includes red ("R"), green ("G"), and color blue ("B") color filters to display colors. The color filter 220 absorbs or transmits light of a specific wavelength for example through R, G, and B pigments, thereby displaying R, G, and B colors. The LCD panel can display the various colors by additive mixture of the transmitted R, G, and B lights.

The overcoat layer 230 is formed of a transparent organic material to protect the color filter 220 and the black matrix 210. The overcoat layer 230 is formed for good step coverage and insulation of the common electrode 240.

The common electrode 240 is formed of a transparent conductor (e.g., a metal) such as indium tin oxide ("ITO") or indium zinc oxide ("IZO"). The common electrode 240 receives the common voltage, i.e. a reference voltage. The shape of the common electrode 240 contributes to defining electric fields generated through the liquid crystal layer due to the differences for example between the common voltage and the data voltage of the pixel electrode 160. As better seen for example in FIGS. 4 and 5A, the common electrode 240 is arranged to include a symmetrical set of oblique stripes inclined toward the long or short side of the second base substrate 201.

A second alignment layer (not shown) is formed on a lowest surface of the color filter substrate 200 including the common electrode 240. In an exemplary embodiment, a second horizontal alignment layer is formed on the color filter substrate 200. A rubbing direction of the second alignment layer, like the rubbing direction of the TFT substrate 100, is parallel with the long or short side of the second base substrate 201. The common electrode 240 is at a prescribed angle with respect to the rubbing direction of the alignment layer. In one embodiment, the prescribed angle is about 10° to about 30°.

Hereinafter, a shape of the common electrode 240 will be described in more detail with reference to the FIG. 1 to FIG. 4.

Figure 4:
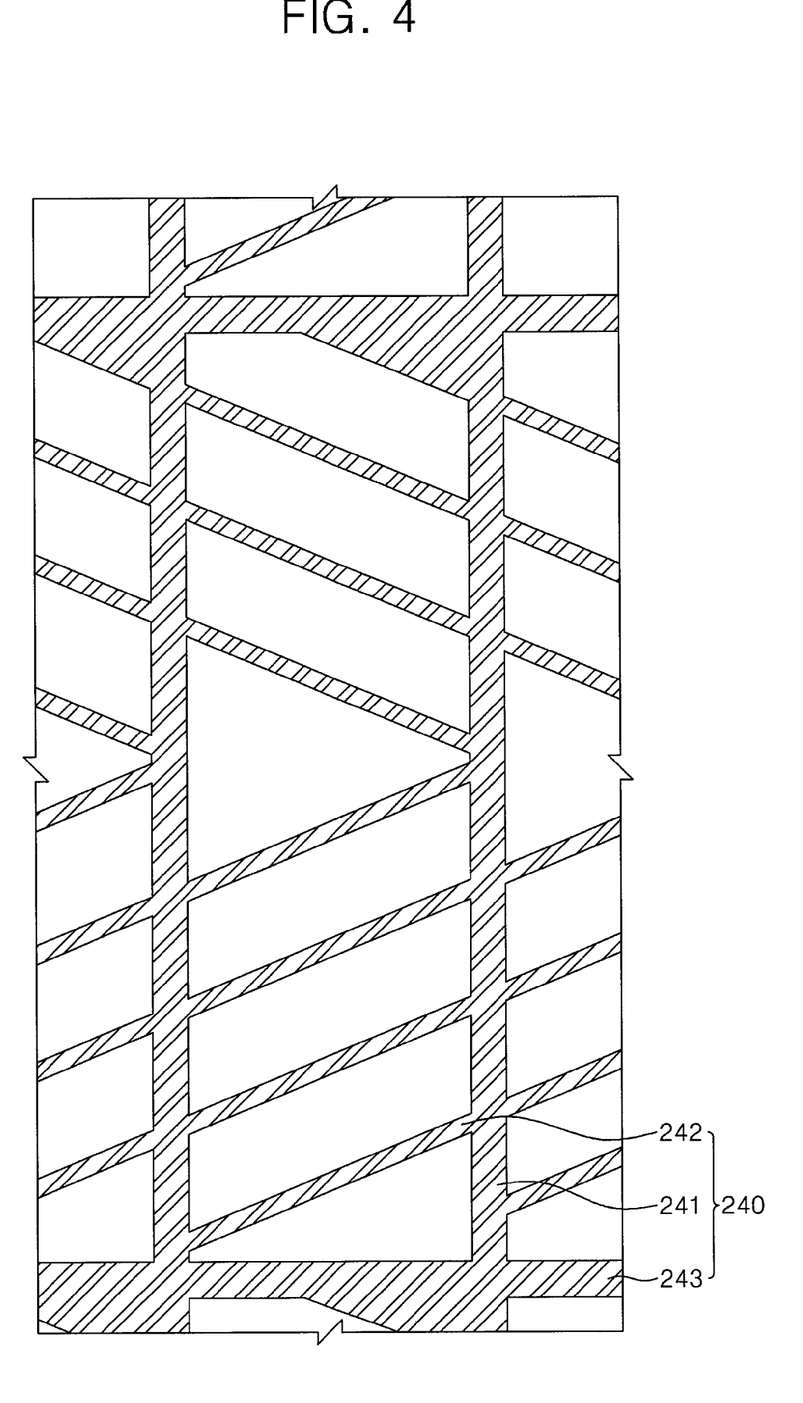
FIG. 4 is a plan view illustrating a common electrode shown in FIG. 1.

FIG. 4 is a plan view illustrating the common electrode shown in FIG. 1 according to one exemplary embodiment of the present invention.

The common electrode 240 includes a first pattern line 241, a second pattern line 242, and a third pattern line 243.

The first pattern line 241 extends vertically to overlap the data line 140 in the TFT substrate below.

The second pattern line 242 is obliquely formed relative to the first pattern line 241 and extended linearly to become connected to two parallel and successive ones of the first pattern lines 241. The second pattern lines 242 are formed to run parallel with the oblique lines of the pixel electrode 160 with the same spacing distance being present between successive ones of the second pattern lines 242 as is present between successive ones of the oblique lines of the pixel electrode 160. The second pattern lines 242 are staggered relative to the oblique lines of the pixel electrodes 160 so as to maintain a same staggering distance between oblique lines of the TFT substrate and oblique lines of the color filters substrate. An example of the staggering is seen for example in FIG. 3 between common electrode oblique line 242 and illustrated oblique line portions 160 of the underlying pixel-electrode. As a result of this staggered configuration, when a voltage difference is established between the common electrode portion and the pixel-electrode of a given pixel area, the second pattern lines 242 create a liquid crystal driving electric field between themselves and the corresponding oblique lines of the pixel electrode 160 in which a lateral electric field component and a vertical electric field component are mixed together.

The third pattern line 243 is transversely formed to generously overlap with the underlying gate line segment 110 as may be seen for example in FIG. 3. A common voltage is supplied to the third pattern line 243. At this time, an electric field is formed between the third pattern line 243 and the underlying gate line segment 110 where the formed electric field is different from the fringe fields formed between the staggered oblique lines. The third pattern line 243 is shaped to prevent an extraneous liquid crystal orientation influence that can be exerted by its electric field alone so that the liquid crystal molecules affected by the liquid crystal driving electric field generated between the oblique line of the adjacent pixel electrode 160 and the adjacent second pattern line 242 may continue to be substantially similarly regularly arranged as one moves from the vicinity of the second pattern lines 242 towards the region where the third pattern line 243 overlaps the gate line segment 110. For doing this, the third pattern line 243 may formed above the gate line segment 110 with a substantially larger width than the gate line segment 110. The third pattern line 243 works to prevent extraneous light leakage around the region of the gate line segment 110 by forming an electric field to the underlying gate line segment 110 where the formed third-line to gate-line field is at least partially intermixed with and thus controlled by the liquid crystal driving electric field formed between the pixel electrode 160 and the adjacent second pattern line 242.

More specifically, the third pattern line 243 of the common electrode 240 operates to prevent light leakage from getting around a misaligned black matrix 210 by intentionally inducing cross talk between the electric fields of the pixel-electrode lines 160 and the electric field of the gate line segment 110.

For example, when the LCD panel drives the liquid crystal to display a black or dark gray level in the pixel area of the adjacent pixel-electrode, the liquid crystals in the vicinity of the gate line segment 110 are influenced by this pixel darkening drive to be irregularly arranged due to the influence of the fringe electric fields generated between the substantially wide third pattern line 243 and the adjacent lines of the pixel-electrode even while the gate line segment 110 is receiving a substantially different voltage (e.g., a gate turn on voltage) from the black or dark gray level voltage stored on the adjacent pixel-electrode 160. If not misaligned, the black matrix 210 should prevent leakage of light transmitted through these irregularly arranged liquid crystals around the vicinity of the gate line segment 110 irrespective of the current voltage on the gate line 110. However, when the black matrix 210 is misaligned by a relatively large margin due to misalignments during assembly, the black matrix by itself may fail to block the light that is influenced only by the voltage on the gate line 110. However, in the illustrated embodiments (e.g., FIGS. 4 and 5A) the electric fields formed about the gate line 110 are not free of influence from the black or dark gray causing fields formed between the wide third pattern line 243 and the nearest oblique line 160 of the pixel-electrode. As a result of this intentional cross talk influence, the LCD panel has less of a decrease in contrast ratio of the black or dark gray levels than seen due to light leakage in panels that do not have such an arrangement of a relatively narrow gate line 110 and a substantially wider common electrode portion 243 overlying that relatively narrow gate line 110. Due to the intentionally created cross talk between the electric fields, the liquid crystals in the vicinity of the gate line 110 are partially controlled by the intermixing of the electric field generated between the pixel electrode 160 and the second pattern line 242. Therefore, the extra wide third portion 243 of the common electrode 240 works to suppress light leakage which is not otherwise blocked by the black matrix 210.

Hereinafter, another exemplary embodiment of the common electrode 240 will be described in more detail with reference to the FIG. 5A and FIG. 5B.

Figure 5A:
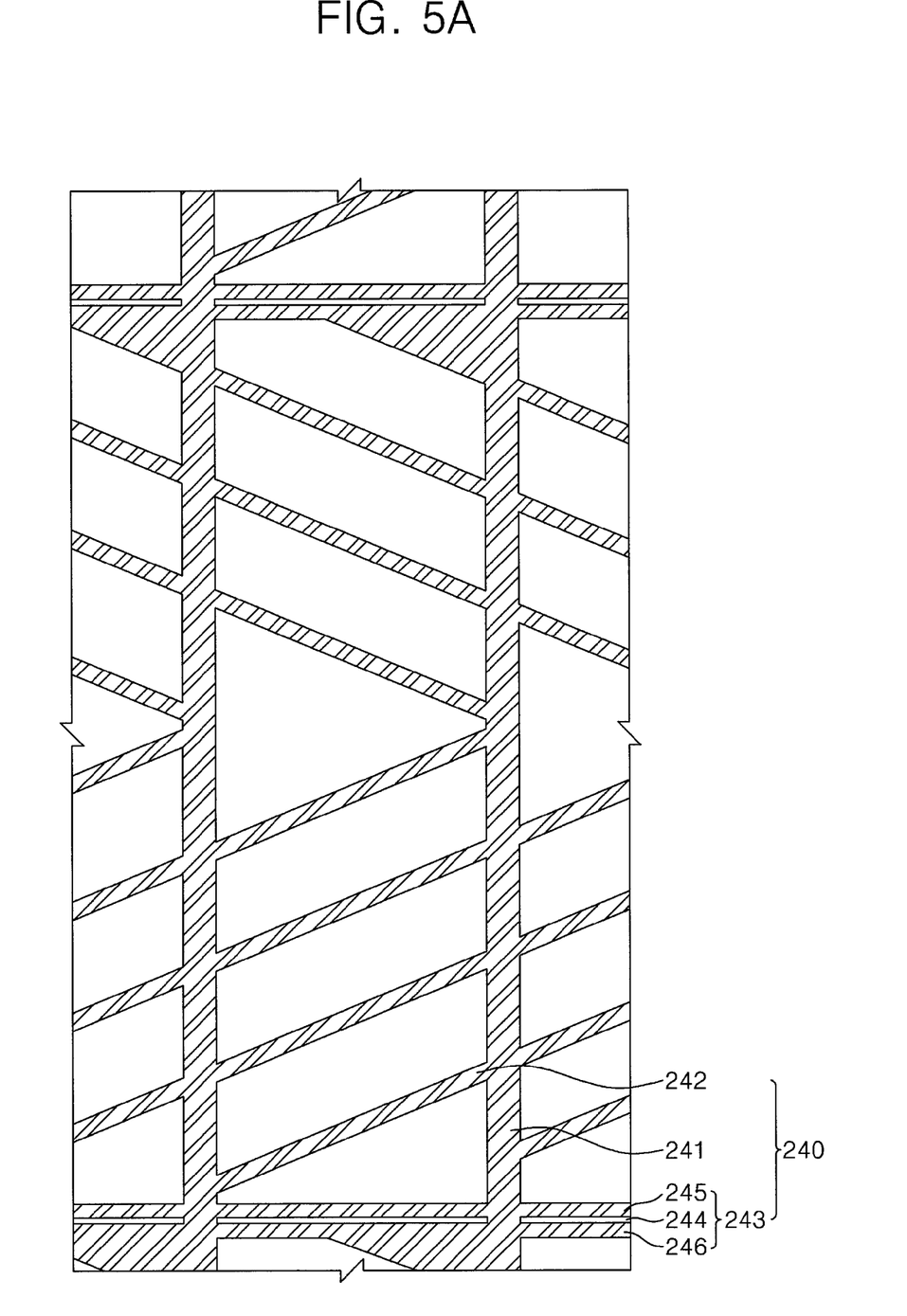
FIG. 5A is a plan view illustrating the common electrode according to another exemplary embodiment.
Figure 5B:
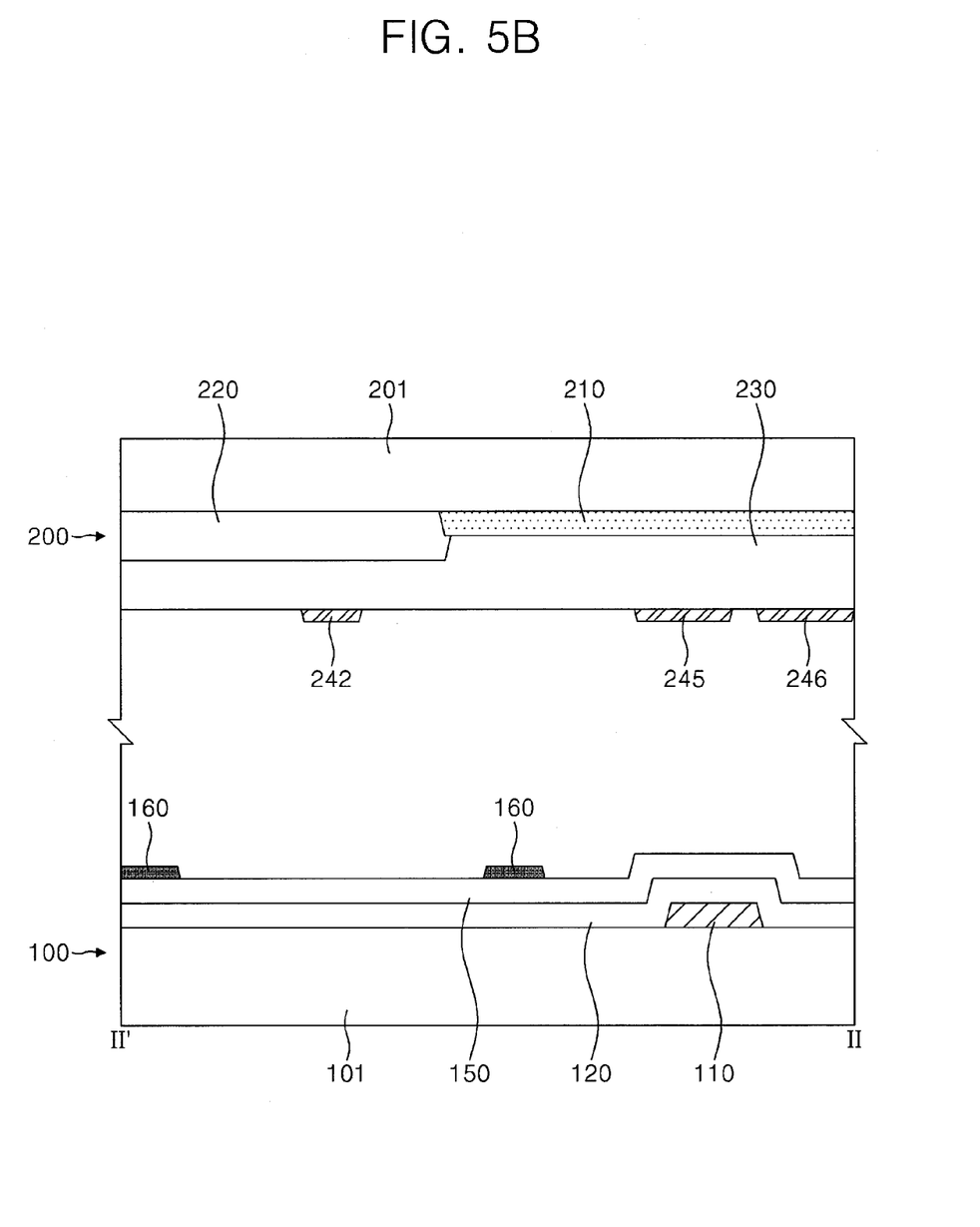
FIG. 5B is a cross-sectional view illustrating the common electrode shown in FIG. 5A.

FIG. 5A and FIG. 5B are respectively a plan view and a cross-sectional view illustrating a common electrode according to another exemplary embodiment of the present disclosure of invention.

The common electrode 240 of FIGS. 5A-5B includes a slit 244 in third portion 243. The slit 244 is formed centrally above the gate line 110 so that the third portion 243 still generously overlaps the gate line 110 and where the slit 244 divides the third pattern line 243 into adjacent sublines 245 and 246.

As in the case of FIG. 4, the common electrode 240 includes a first pattern line 241 extending in the vertical direction, a second oblique pattern line 242 and a third horizontal pattern line 243. The detailed descriptions of the first pattern line 241 and the second pattern line 242 will be omitted here since these are substantially the same as the in the first exemplary embodiment of FIG. 4.

The third pattern line 243 is transversely formed to generously overlap the gate line 110. The third pattern line 243 is divided into two or more parts by for example the illustrated first slit 244. For example, in the illustrated embodiment the third pattern line 243 is formed to be divided into a first subline 245 and a second subline 246 by the slit 244. The slit 244 is formed in the third pattern line 243 with a prescribed length and width such as shown in FIG. 5A for example. The first subline 245 and the second subline 246 operate to suppress the influence of the electric field generated only be the narrower gate line 110. The combination of the first subline 245 and the second subline 246 is sufficiently wide so as to create a substantial amount of crosstalk so that the field between pixel electrode 160 and the second pattern line 242 mixes in with the field of the gate line 110 and thus partially controls the orientation of the liquid crystal molecules around the vicinity of the gate line 110. Therefore, the wide configuration of the first subline 245 and the second subline 246 operate to suppress light leakage which might otherwise occur due to misalignment of the black matrix 210 caused by an assembly defect.

As described above, an LCD panel in accordance with the disclosure includes a generously wide common electrode portion (243) that overlaps with a substantially narrower gate line and which is distanced from the nearest oblique line of the pixel-electrode so as to form an electric field together with the gate line that is crosstalk wise influenced by the field (e.g., black or dark gray luminosity field) of the adjacent pixel-electrode and is thus suppressed from generating stray light when the adjacent pixel-electrode is in a black or dark gray luminosity mode. Thus even if the black matrix formed at the upper side of the liquid crystal is misaligned, the liquid crystal display panel operates to suppress light leakage around the gate line by controlling the fields that might cause irregularly arranged distributions of liquid crystal around the gate line. Therefore, the so-configured LCD panel helps to reduce deterioration of contrast ratio when the black mask is misaligned.

Although exemplary embodiments have been described in detail hereinabove, it should be understood that many variations and/or modifications of the basic concepts taught herein may become apparent to those skilled in the art in light of the above teachings and thus will still fall within the spirit and scope of the present disclosure.

What is claimed is:

1. A liquid crystal display panel comprising:
   a first base substrate;
   a plurality of linearly elongated gate lines extending in a first direction and a plurality of linearly elongated data lines extending in a different second direction, the plurality of gate lines and the plurality of data lines being disposed on the first base substrate and crossing each other, the plurality of gate lines including a first gate line;
   a pixel electrode including horizontal lines, vertical lines, a first oblique line, and a second oblique line disposed on the first substrate, the first oblique line and the second oblique line being in different directions from each other with respect to the first direction, wherein the first oblique line and the second oblique line connect the vertical lines to each other and are spaced apart according to a predetermined spacing distance;
   a second base substrate;
   a common electrode disposed on the second base substrate, the common electrode having members alternately positioned with respect to members of the pixel electrode, wherein the common electrode includes a first portion disposed parallel to the plurality of data lines, a second portion disposed parallel to the plurality of data lines, and a third portion disposed parallel to the plurality of gate lines and disposed between the first portion and the second portion, the first portion being connected to the second portion through the third portion, and wherein the third portion of overlaps the first gate line and includes a slit that is parallel to the first gate line; and
   a liquid crystal layer disposed between the first and second base substrates.

2. The liquid crystal display panel of claim 1, wherein the pixel electrode includes spaced apart first stripes with a prescribed spacing distance, and wherein the common electrode includes spaced apart second stripes with the same spacing distance.

3. The liquid crystal display panel of claim 1, wherein the third portion overlaps at least one gate electrode.

4. The liquid crystal display panel of claim 1, wherein the slit is disposed between the first portion and the second portion, and the slit extends from the first portion to the second portion.

5. The liquid crystal display panel of claim 1, wherein the common electrode includes a triangular cutout portion.

6. A liquid crystal display panel comprising:
   a first base substrate;
   a plurality of linearly elongated gate lines extending in a first direction and a plurality of linearly elongated data lines extending in a different second direction, the plurality of gate lines and the plurality of data lines being disposed on the first base substrate and crossing each other, the plurality of gate lines including a first gate line;
   a pixel electrode including a first oblique line and a second oblique line disposed on the first substrate, the first oblique line and the second oblique line being inclined in different directions from each other with respect to the first direction;
   a second base substrate;
   a common electrode disposed on the second base substrate, wherein the common electrode comprises:
      a linearly extending first pattern line formed to be parallel with the plurality of data lines;
      a linearly extending second pattern line disposed to extend parallel with but laterally staggered apart from a corresponding pattern lines of the pixel electrode according to a prescribed distance to thereby define, when energized, a liquid crystal driving electric field together with the pixel electrode;
      a third pattern line disposed parallel to the plurality of gate lines, the third pattern line overlapping the first gate line so as to define when energized, a differently oriented electric field as between the first gate line and the third pattern line, the third pattern line including a slit disposed parallel to the first gate line and disposed over the gate line; and
      a fourth pattern line disposed parallel to the plurality of data lines, the third pattern line being disposed between the first pattern line and the fourth pattern line, the fourth pattern line being connected to the first pattern line through the third pattern line; and
   a liquid crystal layer disposed between the first and second base substrates.

7. The liquid crystal display panel of claim 6, wherein the third pattern line is formed with a larger width than a width of the first gate line.

8. The liquid crystal display panel of claim 6, wherein the third pattern line includes a rectangular portion and a trapezoidal portion, the rectangular portion being disposed between the first pattern line and the trapezoidal portion.

9. The liquid crystal display panel of claim 6, wherein the slit is extends from the first pattern line to the fourth pattern line.

10. The liquid crystal display panel of claim 6, wherein the slit divides the third pattern line overlapping the first gate line into at least two parts.

11. The liquid crystal display panel of claim 6, wherein the third pattern line overlaps at least one gate electrode.

12. A liquid crystal display (LCD) assembly comprising:
a first base substrate and a second base substrate, the first base substrate having a pixel-electrode and an adjacent gate line segment formed thereon, the second base substrate having a common electrode formed thereon,
wherein the common electrode and the pixel-electrode have staggered line patterns respectively defined therein for defining liquid crystals driving fields for driving interposed liquid crystals into distributed orientations so as to allow for side viewing of a displayed image as well as heads on viewing of the image; and
wherein the common electrode has a gate line overlapping portion that generously overlaps the adjacent gate line segment so that at least one of the liquid crystals driving fields substantially intermixes with an extraneous electric field formed between the gate line overlapping portion and the gate line segment so as to thereby co-influence liquid crystals influenced by the extraneous electric field, the common electrode further having a first portion and a second portion each being disposed parallel to data lines of the LCD assembly, the gate line overlapping portion being disposed parallel to the adjacent gate line segment and being disposed between the first portion and the second portion, the first portion being connected to the second portion through the gate line overlapping portion, the gate line overlapping portion including a slit disposed parallel to the adjacent gate line segment.

13. The liquid crystal display panel of claim 1, wherein the pixel electrode includes a plurality of spaced apart first linear segments that are parallel to one another and a plurality of spaced apart second linear segments that are parallel to one another, the first linear segments including the first oblique line that extends obliquely relative to the first direction, the second linear segments including the second oblique line that extends obliquely relative to the first direction.

\* \* \* \* \*